United States Patent
Kuykendall

(10) Patent No.: US 8,567,563 B2
(45) Date of Patent: Oct. 29, 2013

(54) FRONT BEARING GREASE APPLICATOR

(75) Inventor: Henry Kuykendall, Pinson, AL (US)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 13/072,139

(22) Filed: Mar. 25, 2011

(65) Prior Publication Data

US 2012/0241257 A1   Sep. 27, 2012

(51) Int. Cl.
 *F16N 3/10*   (2006.01)
(52) U.S. Cl.
 USPC ............................................. 184/5.1
(58) Field of Classification Search
 USPC ............................................. 184/5.1, 89, 100
 See application file for complete search history.

(56) References Cited

U.S. PATENT DOCUMENTS

| | | | |
|---|---|---|---|
| 1,901,580 A * | 3/1933 | Bott | 384/477 |
| 2,583,019 A * | 1/1952 | Saywell | 277/589 |
| 3,469,655 A | 9/1969 | Moreno | |
| 4,190,133 A * | 2/1980 | Ploeger | 184/5.1 |
| 4,932,499 A * | 6/1990 | Covert et al. | 184/5.1 |
| 5,303,800 A * | 4/1994 | Persson | 184/5.1 |
| 5,584,359 A | 12/1996 | Reinersman | |
| 6,340,072 B1 | 1/2002 | Lannan | |
| 7,650,806 B2 * | 1/2010 | Tsukada et al. | 74/89.44 |

FOREIGN PATENT DOCUMENTS

| | | |
|---|---|---|
| JP | 2001-271990 | 10/2001 |
| JP | 2008-240933 | 10/2008 |
| WO | 2009-071014 | 6/2009 |

* cited by examiner

*Primary Examiner* — William E Dondero
*Assistant Examiner* — Mark K Buse
(74) *Attorney, Agent, or Firm* — Rankin Hill & Clark LLP

(57) ABSTRACT

A vehicle bearing grease applicator and method for applying a predetermined amount of grease to vehicle wheel bearings includes a hand-holdable bearing grease applicator having a hand-holdable body with a rigid flange disposed at one end and a resilient applicator flange secured to the hand-holdable body in spaced apart relation from the rigid flange. The resilient applicator flange defines an annular concavity facing in a direction opposite the rigid flange. Grease is packed in the annular concavity defined by the applicator flange. The hand-holdable body is held and manipulated so as to align the grease packed annular concavity with a vehicle annular wheel bearing. A force is applied on the hand-holdable body to force the annular flange with the annular concavity toward the vehicle annular wheel bearing thereby applying the grease held by the applicator flange onto the vehicle annular wheel bearing.

20 Claims, 6 Drawing Sheets

FRONT BEARING GREASE APPLICATOR

BACKGROUND

The present disclosure generally relates to hand-held vehicle tools and related methods, and more particularly relates to a hand-holdable vehicle bearing grease applicator and method for applying a predetermined amount of grease to vehicle wheel bearings.

It is sometimes desirable to apply a grease or other lubricant to vehicle wheel bearings. For example, during the manufacture of a vehicle, it is sometimes desirable to apply an amount of grease to a vehicle's front wheel bearings to avoid "stick-slip" noise. Such a noise may occur at the wheel bearing when the vehicle is changed form drive to reverse. In particular, this undesirable noise might result from micro-slip motion of the vehicle's outboard driveshaft joints and inner bearing raceway metal surfaces (i.e., the sticking and slipping of these two surfaces), particularly when torque is applied to the driveshaft causing it to slightly bind up and release back to its normal position.

Hand-held and machine operated grease applicators for applying grease to vehicle wheel bearings are known. Many of the machine-type applicators are expensive and complex. Moreover, machine-type applicators do not always apply a consistent amount of grease and/or prevent contaminants within the grease. The known hand-held applicators are often insufficient for applying a predetermined amount of grease to the wheel bearing and/or can be difficult to use. Additionally, some grease applicators do not limit the application of grease to specified areas of the wheel bearing.

SUMMARY

According to one aspect, a bearing grease applicator for applying a predetermined amount of grease to vehicle front wheel bearings includes a hand-holdable body having a radial flange disposed at one end thereof and a hub portion projecting axially beyond the radial flange. The bearing grease applicator further includes a resilient annular applicator portion fixed to the hand-holdable body. The annular applicator portion has a central opening receiving the hub portion of the hand-holdable body. The annular applicator portion defines an annular recess for receiving the predetermined amount of grease.

According to another aspect, a vehicle bearing grease applicator includes a hand-holdable body having a first end and a second end, a rigid flange disposed at the first end of the hand-holdable body, and a resilient applicator flange also disposed at the first end axially outside the rigid flange and in axially spaced relation relative to the rigid flange. The resilient applicator flange defines an annular concavity facing in a direction opposite the rigid flange for receiving a predetermined amount of grease.

According to a further aspect, a method for applying a predetermined amount of grease to vehicle wheel bearings using a hand-held applicator includes providing a hand-holdable bearing grease applicator having a hand-holdable body with a rigid flange disposed at one end and a resilient applicator flange secured to the hand-holdable body in spaced apart relation from the rigid flange, packing grease in an annular concavity defined by the applicator flange in a direction facing away from the rigid flange, holding the hand-holdable body and manipulating the hand-holdable body to align the annular concavity with the grease packed therein with a vehicle annular wheel bearing, and applying a force on the hand-holdable body to force the annular flange with the annular concavity toward the vehicle annular wheel bearing thereby applying the grease held by the applicator flange onto the vehicle annular wheel bearing.

DETAILED DESCRIPTION

Figure 1:
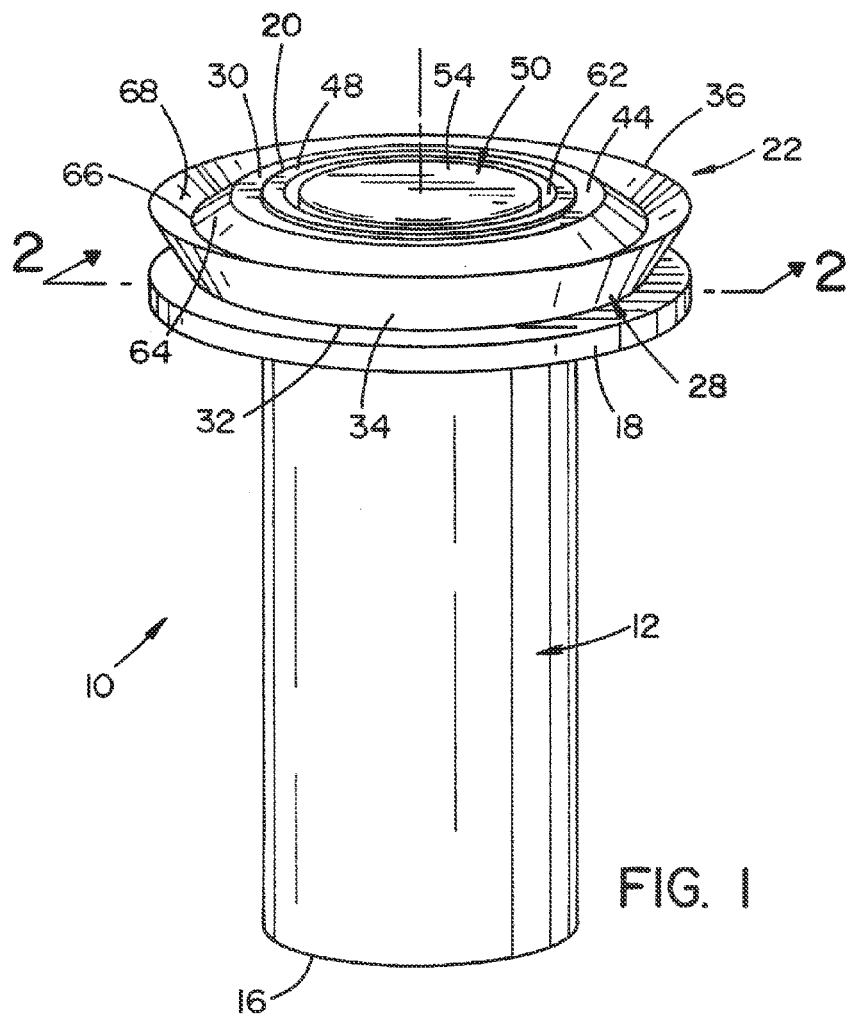
FIG. 1 is a front elevation perspective view of a bearing grease applicator for applying a predetermined amount of grease to vehicle wheel bearings.
Figure 2:
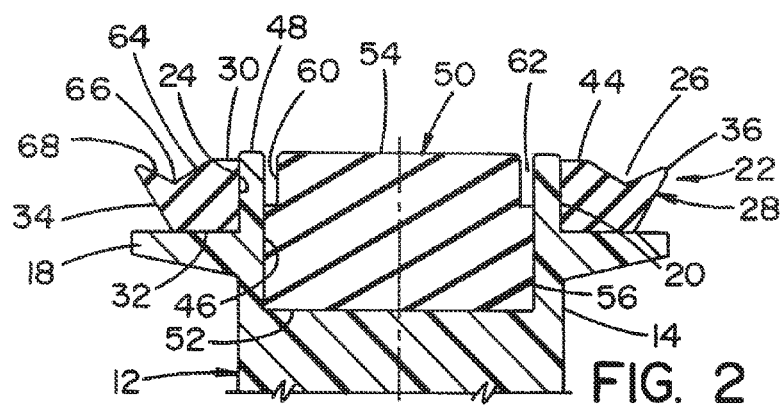
FIG. 2 is a partial cross-sectional view of the bearing grease applicator taken along the line 2-2 of FIG. 1.
Figure 3:
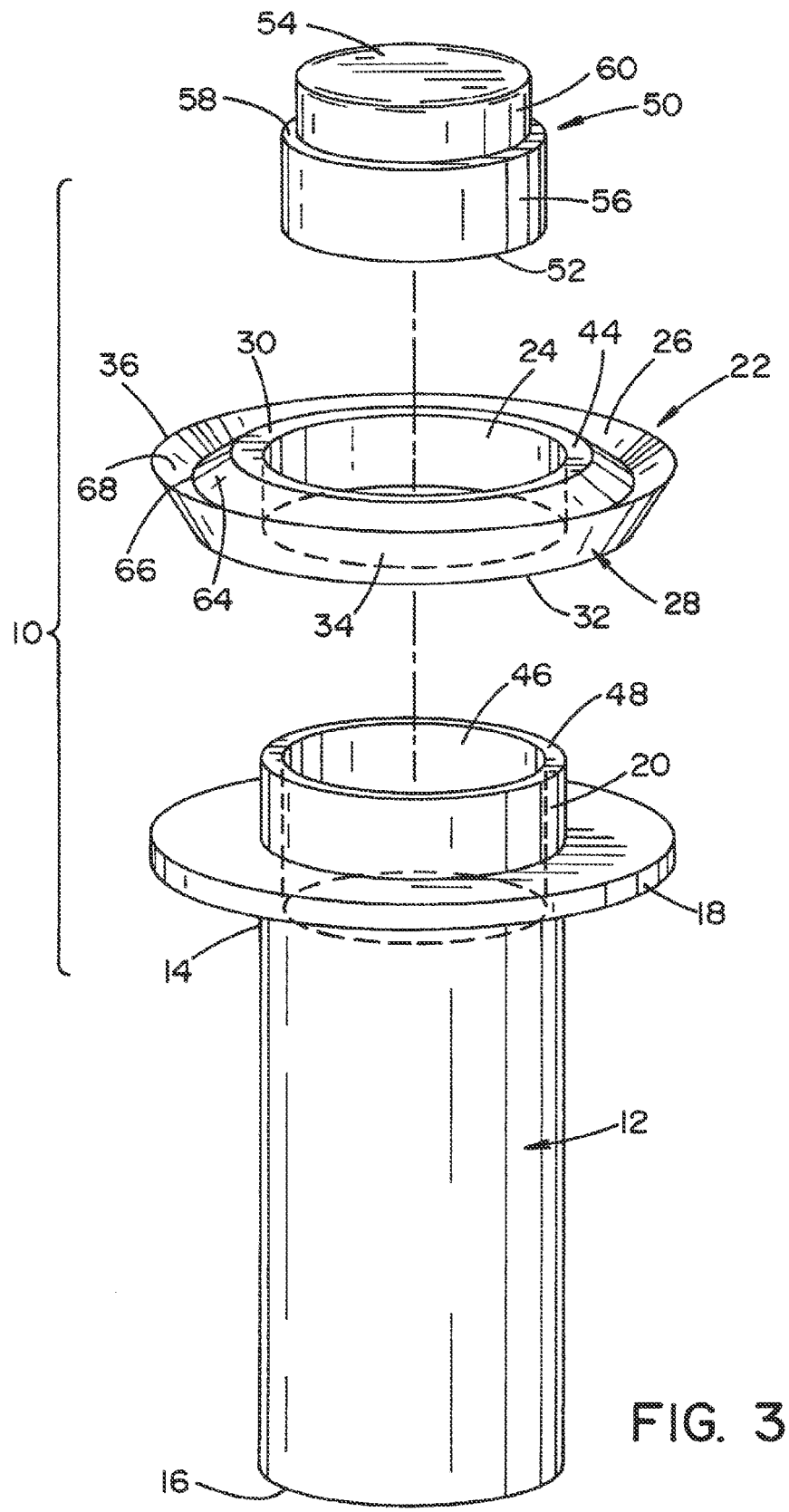
FIG. 3 is an exploded perspective view of the bearing grease applicator of FIG. 1.

Referring now to the drawings, wherein the showings are for purposes of illustrating one or more exemplary embodiments and not for purposes of limiting same, FIGS. 1-3 illustrate a bearing grease applicator for applying a predetermined amount of grease to vehicle wheel bearings, the applicator generally designated by reference 10. In the illustrated embodiment, the bearing grease applicator 10 includes a hand-holdable body 12 and thus the applicator 10 can be referred to as a hand-held applicator. The hand-holdable body 12 can be a cylindrical body having a first end 14 and a second end 16. The bearing grease applicator 10, and more particularly the hand-holdable body 12, can have a rigid flange 18 (also referred to as a rigid radial flange) disposed at one end thereof (i.e., at the first end 14) and a hub portion 20 projecting axially beyond the radial flange 18. The rigid flange 18 can extend radially or orthogonally relative to a longitudinal axis of the hand-holdable body 12.

As shown, the bearing grease applicator 10 further includes a resilient annular applicator portion or flange 22 also disposed at the first end 14 of the hand-holdable body 12 axially outside the rigid flange 18 and in axially spaced relation relative to the rigid flange 18. In the illustrated embodiment, the applicator portion or flange 22 is formed as a portion of a resilient applicator body 28 (e.g., a rubber body) that is mounted or fixed to the hand-holdable body 12. The applicator body 28, and more particularly the applicator portion or flange 22, can have a central opening 24 (FIG. 3) that receives the hub portion 20 of the hand-holdable body 12 therein. This allows the hand-holdable body 12 and the applicator body 28 to be separately formed (e.g., of different materials) and then the applicator body 28 and the applicator portion 22 thereof can be fitted onto the hub portion 20 of the hand-holdable body 12. By way of example, the hand-holdable body 12 can be formed of polyethylene or polypropylene and the applicator body 28 and portion 22 can be formed of rubber, though other materials could be used.

For carrying grease, the applicator portion 22 defines an annular recess 26 (also referred to as an annular concavity). In particular, the annular recess 26 can be formed as an annular concavity within the applicator portion 22 that can receive a predetermined amount of grease (e.g., 5 grams) as will be described in more detail below. In the illustrated embodiment, the annular recess 26 is formed in an upper surface 30 of the applicator body 28 and faces in a direction opposite the rigid flange 18 (i.e., the annular recess 26 faces away from the rigid flange 18). In use, the annular recess 26 can receive a grease suitable for application on vehicle wheel bearings, such as vehicle front wheel bearings. One such suitable grease is Molykote grease, though other greases can be used. As will be appreciated and understood by those skilled in the art, the annular recess 26 can be sized such that when packed with grease, the annular recess 26, and thus the bearing grease applicator 10, can be presumed with accuracy to contain or hold an exact amount of grease, such as 5 grams of grease.

The applicator body 28 also includes a base surface 32 that is opposite the upper surface 30 and the annular recess 26. The base surface 32 can be seated against the rigid flange 18 and, as shown, can have an outer diameter or circumference that is smaller than that of the rigid flange 18. The central opening 24 extends from the upper surface 30 to the base surface 32. The applicator body 28 of the illustrated embodiment includes an outer radial surface 34 extending from the base surface 32 to a distal radial edge 36 of the applicator portion 22, the distal radial edge 36 forming an outer radial extent of the upper surface 30 and of the annular recess 26. In the illustrated embodiment, the outer radial surface 34 is tapered such that the outer diameter of the base surface 32 is less than an outer diameter of the upper surface 30 and the distal radial edge 36 thereof. As a result, the applicator body 28 is formed as an annular frustoconical body having a narrow end (i.e., the base surface 32) disposed adjacent the rigid flange 18 of the hand-holdable body 12 and a second, wider end (i.e., the upper surface 30) spaced apart from the rigid flange 18.

The distal radial edge 36 of the upper surface 30, which can also be referred to as an outer peripheral edge of the annular applicator portion 22, is formed in the illustrated embodiment as an upturned lip defining an outer radial extent of the annular recess 26. The annular applicator portion 22, and particularly the upper surface 30, can further include an inner radial ring portion 44 defining the central opening 24. As shown, the inner radial ring portion 44 can be the portion of the upper surface 30 annularly adjacent the central opening 24 and is thus radially interposed between the central opening 24 and the annular recess 26. As best shown in FIG. 2, the inner radial ring portion 44 can be axially raised relative to the distal radial edge 36. More specifically, the distal radial edge 36 of the applicator flange 22 can be axially offset (e.g., by about 0.5 mm) relative to the inner radial portion 44. Accordingly, the inner radial portion 44 can be axially spaced from the rigid flange 18 a distance greater than the distal radial edge 36 is axially spaced from the rigid flange 18. In one embodiment, the axial offset between the inner radial portion 44 and the distal radial edge is 0.5 mm.

In the illustrated embodiment, as best shown in FIG. 3, the hand-holdable body 12 is at least partially hollow and includes a hub portion recess 46 defined in the hub portion 20. Accordingly, the hub portion 20 of the illustrated embodiment is defined as a sleeve having a distal axial end 48 disposed in spaced relation relative to the rigid flange 18. As shown, the distal axial end 48 can be raised relative to the upper surface 30 and the inner radial ring portion 44 of the upper surface, both of the applicator portion 22. A plug 50 can be received in the hub portion recess 46. In the illustrated embodiment, the plug 50 is generally cylindrical having a first end 52 received in the hand-holdable body 12 and a second end 54 axially flush with the distal axial end 48 of the hub 20.

The plug 50 can further include a first radial surface portion 56 extending from the first end 52 to a radial shoulder 58 and a second radial surface portion 60 extending from the radial shoulder 58 to the second end 54. A radial offset between the first radial surface portion 56 and the second radial surface portion 60 defines the shoulder 58 and further defines an annular gap 62 between the hub 20 and the plug 50.

In the illustrated embodiment, the annular recess 26 has a v-shape with a first wall portion 64 tapering downward from the inner radial ring portion 44 of the applicator portion 22 to an apex 66 of the v-shape and a second wall portion 68 tapering downward from the distal radial edge 36 of the applicator portion 22 to the apex 66. However, it is to be appreciated by those skilled in the art that the annular recess 26 can have other shapes. For example, the annular recess 26 can have a more generally curved shape. In any case, the shape of the annular recess 26 can be such that the annular recess 26 has a volume that corresponds with a precise amount of grease. In one embodiment, the annular recess 26 has a volume that corresponds with 5 grams of grease. Suitable dimensions for the annular recess 26 can be 10 mm wide by 2 mm deep, though such dimensions are not required.

Figure 4A:
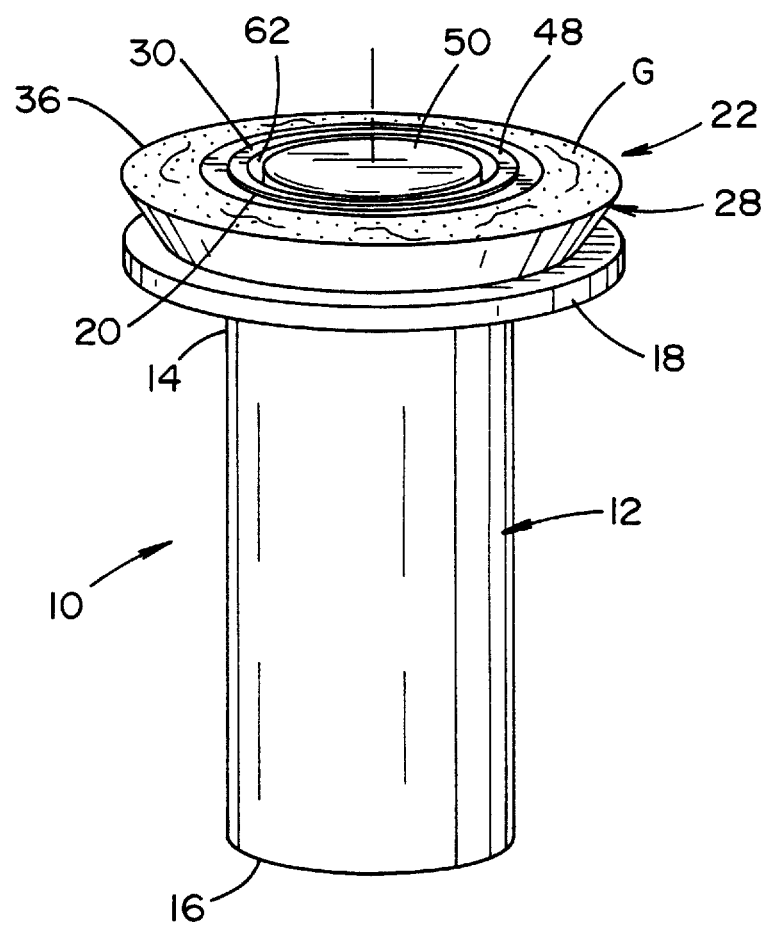
FIG. 4A is a front elevation perspective view of the bearing grease applicator shown packed with grease in a concavity thereof.
Figure 4B:
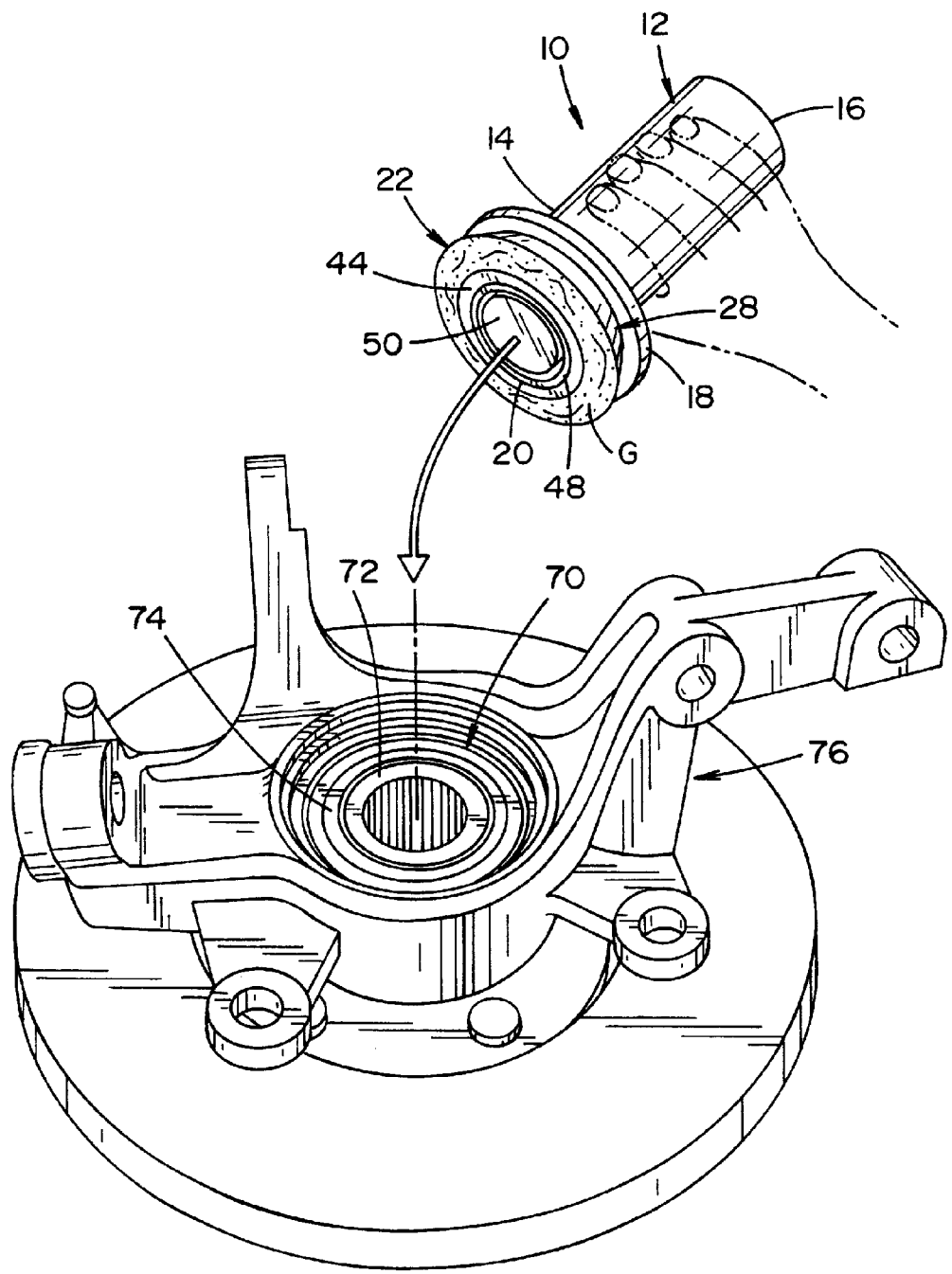
FIG. 4B is a perspective view showing the packed bearing grease applicator being manipulated into position on vehicle wheel bearings disposed on a vehicle hub assembly.

With reference now to FIGS. 4A-D, a method for applying a predetermined amount of grease to vehicle wheel bearings using a hand-held applicator will now be described. By way of example, the method will be described in association with the bearing grease applicator 10 of FIGS. 1-3, though it is to be appreciated that other bearing grease applicators could be used. In the method, as shown in FIG. 4A, a hand-holdable bearing grease applicator is provided, such as bearing grease applicator 10 having the hand-holdable body 12 with the rigid flange 18 disposed at one end (I.e., end 14) and the resilient applicator flange 22 secured to the hand-holdable body 12 in spaced apart relation from the rigid flange 18. As already described, the annular applicator flange 22 can be a portion of the resilient applicator body 28.

The annular concavity 26 (FIGS. 1-3) defined by the flange 22, which faces in a direction away from the rigid flange 18, can be packed with grease G. As already described herein, the grease G can be Molykote grease or another suitable grease for application on vehicle wheel bearings. Next, with additional reference to FIG. 4B, the hand-holdable body 12 is pressed against annular wheel bearings 70 of a vehicle's knuckle assembly 76. In the illustrated embodiment, the knuckle assembly 76 is shown removed from the vehicle; however, it is to be appreciated that the applicator 10 could be applied against the knuckle assembly 76 while still on the vehicle (e.g., by taking off the vehicle's axle).

In any case, the hand-holdable body 12 is held and manipulated to align the annular recess 26 with the grease G packed therein with the vehicle annular wheel bearing 70 on the vehicle's knuckle assembly 76. In particular, the hub 20 and/or the inner radial ring portion 44 can be aligned with hub face surface 72, which can facilitate prevention of grease being applied to this surface 72, and the annular recess 26 and the grease G are aligned with the bearing/drive shaft contact surface 74 of the wheel bearings 70. The hub and/or the inner radial ring portion 44 can serve to prevent application of the grease G into hub splines or spindle-nut and drive shaft threaded areas, particularly due to the axial offset of these surfaces. Outside the contact surface 74 to which the grease G is applied, a spline, thread or encoder surface may be present against which application of grease G is permissible in normal applications.

Figure 4C:
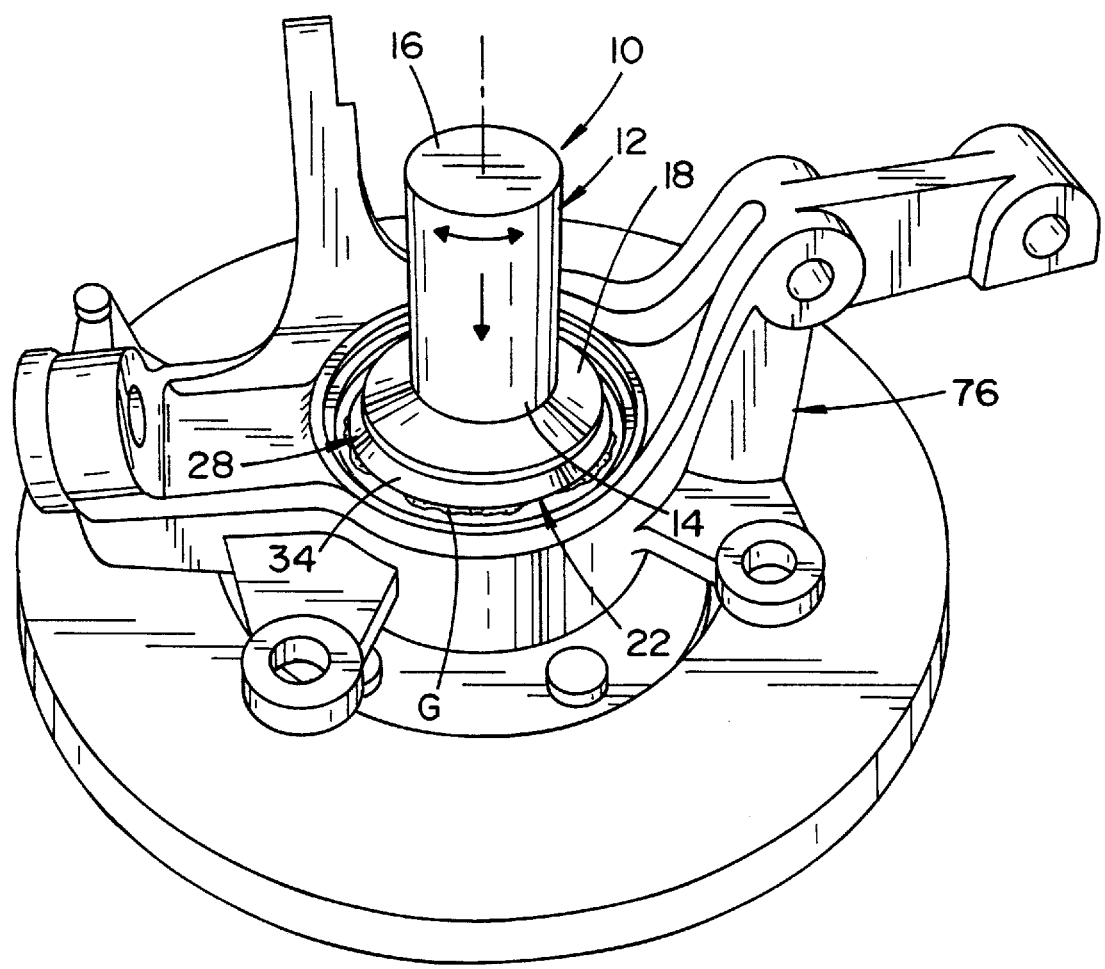
FIG. 4C is a perspective view showing the packed bearing grease applicator being applied against the vehicle wheel bearings of the vehicle hub assembly.

Referring to FIG. 4C, a downward force can be applied on the hand-holdable body 12 to force the annular flange 22 with the annular recess 26 toward the vehicle annular wheel bearings 70, and particularly the contact surface 74 thereof, to apply the grease G held by the applicator flange 22. As shown, the applicator body 28 is configured such that when the external axially directed force is applied on the hand-holdable body 12 in the direction of the applicator portion 22 (i.e., toward the wheel bearing surface 74), this causes the annular applicator portion 22 to radially expand and flatten and thereby disperse the predetermined amount of grease G to the wheel bearings 70 of the knuckle 76. More specifically, the annular flange 22 defining the annular recess 26 is axially spaced from the rigid flange 18 a first predetermined distance before application of the grease G to the wheel bearings 74; however, after application of the external force and during application of the grease G, the annular flange 22 is spaced from the rigid flange 18 a second predetermined distance that is less than the first predetermined distance. In particular, the rigde flange 18 sandwiches the applicator portion 22 together with the knuckle assembly 76, and more particularly the bearing surface 74 and wheel bearings 70 of the knuckle assembly 76, against which the applicator portion 22 is applied, to apply the grease G. While the downward force is being applied, the hand-holdable body 12 can be twisted to further facilitate dispersion of the grease G onto the vehicle annular wheel bearing 74.

Figure 4D:
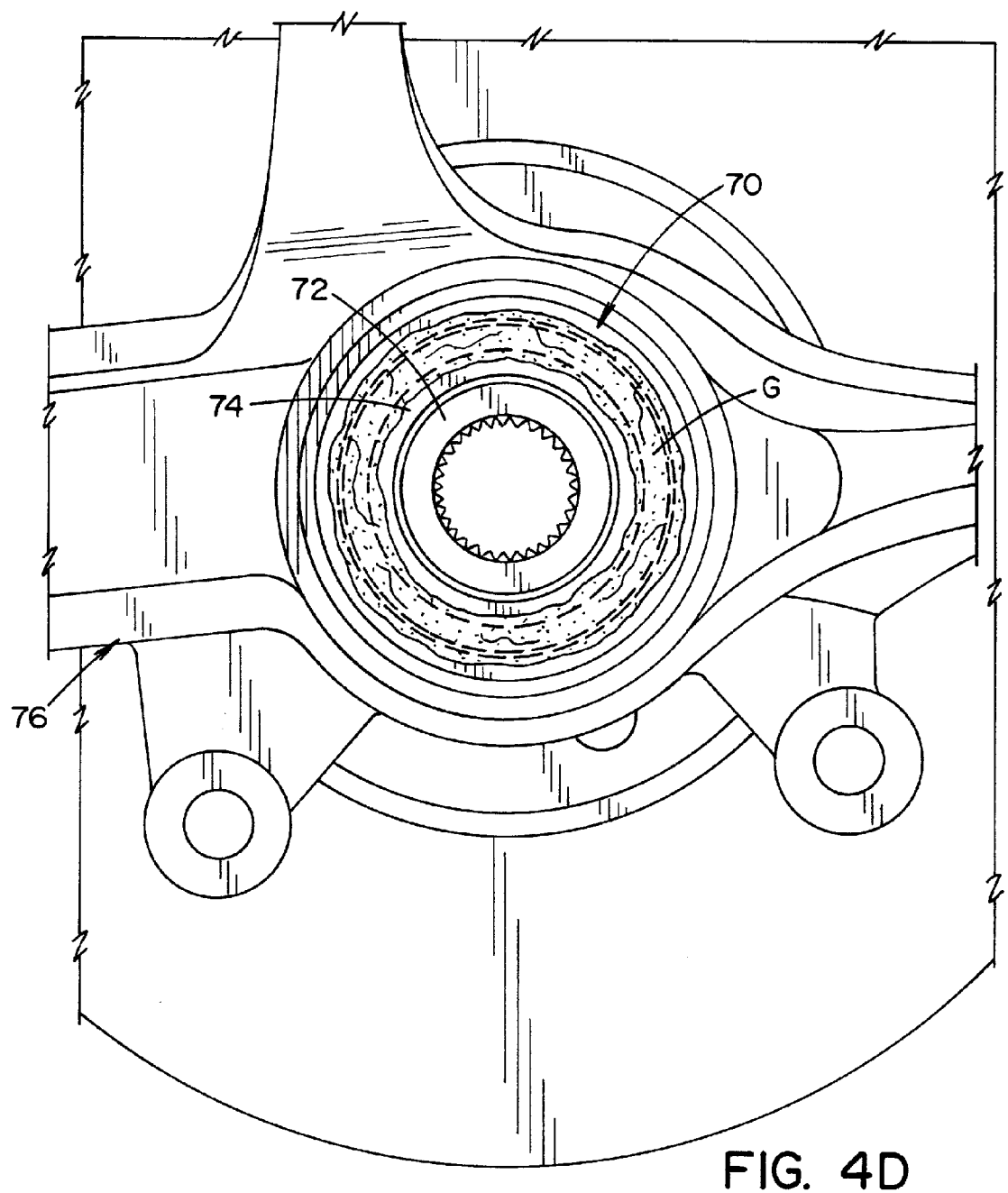
FIG. 4D is a plan view of the vehicle wheel bearings and the hub assembly after grease has been applied thereto and after the bearing grease applicator has been removed.

After application of the grease G, the bearing grease applicator 10 can be removed from the wheel bearing and the grease G remains on the wheel bearing as shown in FIG. 4D. The result of the method is that an exact or predetermined amount of grease, such as 5 grams, is applied by the vehicle bearing applicator 10 per use of the applicator 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A bearing grease applicator for applying a predetermined amount of grease to vehicle front wheel bearings, comprising:
a hand-holdable body having a radial flange disposed at one end thereof and a hub portion projecting axially beyond the radial flange at said one end;
a resilient annular applicator portion fixed to the hand-holdable body adjacent said radial flange, the annular applicator portion having a central opening receiving the hub portion of the hand-holdable body, the annular applicator portion defining an annular recess, having an open end facing axially outward for receiving the predetermined amount of grease.

2. The bearing grease applicator of claim 1 wherein said annular recess is formed as an annular concavity within the annular applicator portion.

3. The bearing grease applicator of claim 1 wherein an outer peripheral edge of the annular applicator portion is formed as an upturned lip defining an outer radial extent of the annular recess.

4. The bearing grease applicator of claim 3 wherein the annular applicator portion includes an inner radial ring portion defining the central opening, the inner radial ring portion axially raised relative to a distal end of the upturned lip.

5. The bearing grease applicator of claim 4 wherein the inner radial ring portion is axially raised by about 0.5 mm relative to the distal end of the upturned lip.

6. The bearing grease applicator of claim 1 wherein the annular applicator portion has an annular frustoconical body portion with a first narrow end disposed adjacent the radial flange of the hand-holdable body and a second wider end in which the annular recess is defined disposed farther away from the radial flange than the first narrow end.

7. The bearing grease applicator of claim 6 wherein the frustoconical body portion is configured such that an external axial force applied on the hand-holdable body in the direction of the applicator portion when the applicator portion is positioned against a vehicle front wheel bearing knuckle causes the annular applicator portion to radially expand and flatten and thereby disperse the predetermined amount of grease to the front wheel bearings of the knuckle.

8. The bearing grease applicator of claim 1 wherein an upper portion of the annular applicator portion defining the annular recess is axially spaced from the radial flange before application of the predetermined amount of grease to the vehicle front wheel bearings.

9. The bearing grease applicator of claim 1 wherein the hand-holdable body is a cylindrical body and the flange extends radially relative to a longitudinal axis of the cylindrical body, the flange sandwiching the applicator portion together with a knuckle against which the applicator portion is applied.

10. The bearing grease applicator of claim 9 further including a plug received in the hub portion recess.

11. The bearing grease applicator of claim 1 wherein the hand-holdable body is generally hollow and includes a hub portion recess defined in the hub portion.

12. A vehicle bearing grease applicator, comprising:
a hand-holdable body having a first end and a second end;
a rigid flange disposed at the first end of the hand-holdable body; and
a resilient applicator flange also disposed at the first end axially outside the rigid flange and in axially spaced relation relative to the rigid flange, the resilient applicator flange defining an annular concavity facing in a direction opposite the rigid flange for receiving a predetermined amount of grease.

13. The vehicle bearing grease applicator of claim 12 wherein the resilient applicator flange is formed by a resilient annular applicator body having a base surface that is opposite the annular concavity and seated against the rigid flange, the base surface having an outer diameter smaller than that of the rigid flange.

14. The vehicle bearing grease applicator of claim 13 wherein the resilient annular applicator body includes an outer frustoconical radial surface extending from the base surface to a distal radial edge of the resilient applicator flange enabling the resilient applicator flange to flex radially outwardly when axial pressure is applied to the hand-holdable body with the annular concavity seated against associated vehicle wheel bearings.

15. The vehicle bearing grease applicator of claim 12 wherein the hand-holdable body includes a hub portion at the first end projecting axially beyond the rigid flange, the resilient applicator flange having a central opening through which the hub is received.

16. The vehicle bearing grease applicator of claim 15 wherein a distal radial edge of the resilient applicator flange is axially offset relative to an inner radial portion of the resilient applicator flange.

17. The vehicle bearing grease applicator of claim 16 wherein the inner radial portion is axially spaced from the rigid flange a distance of about 0.5 mm greater than the distal radial edge.

18. The vehicle bearing grease applicator of claim 12 wherein the resilient applicator flange is formed of rubber.

19. A method for applying a predetermined amount of grease to vehicle wheel bearings using a hand-held applicator, comprising:
- providing a hand-holdable bearing grease applicator having a hand-holdable body with a rigid flange disposed at one end and a resilient applicator flange secured to the hand-holdable body in spaced apart relation from the rigid flange;
- packing grease in an annular concavity defined by the applicator flange in a direction facing away from the rigid flange;
- holding the hand-holdable body and manipulating the hand-holdable body to align the annular concavity with the grease packed therein with a vehicle annular wheel bearing; and
- applying a force on the hand-holdable body to force the annular flange with the annular concavity toward the vehicle annular wheel bearing thereby applying the grease held by the applicator flange onto the vehicle annular wheel bearing.

20. The method of claim 19 further including:
- twisting the hand-holdable body as the downward force is applied thereto to further facilitate dispersion of the grease onto the vehicle annular wheel bearing.

* * * * *